H. P. BRAY.
MEANS FOR ATTACHING TUBES TO HEADERS, CHAMBERS, AND THE LIKE.
APPLICATION FILED MAY 25, 1920.

1,384,989. Patented July 19, 1921.

INVENTOR
H. P. Bray
BY
ATTORNEY

UNITED STATES PATENT OFFICE.

HERBERT PAINE BRAY, OF PINNER, ENGLAND.

MEANS FOR ATTACHING TUBES TO HEADERS, CHAMBERS, AND THE LIKE.

1,384,989.     Specification of Letters Patent.     Patented July 19, 1921.

Application filed May 25, 1920. Serial No. 384,240.

*To all whom it may concern:*

Be it known that I, HERBERT PAINE BRAY, a subject of His Majesty the King of England, and resident of Pinner, in the county of Middlesex, Kingdom of England, have invented certain new and useful Improvements in or Connected with Means for Attaching Tubes to Headers, Chambers, and the like, for which I have filed an application in England, April 8, 1919, of which the following is a specification.

This invention relates to means for attaching steam superheating tubes, water tubes, and the like to headers, chambers, and the like in superheaters, boilers and the like.

The invention refers to attaching means of the kind in which the ends of the tubes are connected to plates or flange blocks which are in turn detachably secured by means of screw-bolts to the steam headers, chambers, collectors, or the like, and means are provided to permit rocking movement of the bolts, plates or blocks, and tubes relatively to the headers or the like and to one another. In one construction of such attaching means it has been proposed to retain the heads of the bolts within holes in the headers or the like by means of bushings screwed into the latter, and to form spherical coöperating surfaces on said bolt heads and bushings, and, in other constructions, to expand or enlarge the ends of the tubes and form them spherical to coöperate with spherical surfaces on the plates or flange blocks.

In the attaching means provided by the present invention the parts are of improved construction, and according to said invention the heads of the bolts are of barrel, spherical or similar shape and rotatably and slidably seated within cylindrical slots formed in the headers or the like; the ends of the tubes or the like are expanded and formed with curved surfaces, and the holes formed in the plates or flange blocks to receive said tube ends are enlarged to form seatings intermediate their ends for coöperation with the said expanded curved surfaces of the tube ends.

The invention will now be described with reference to the accompanying drawing, in which:—

Figure 1:
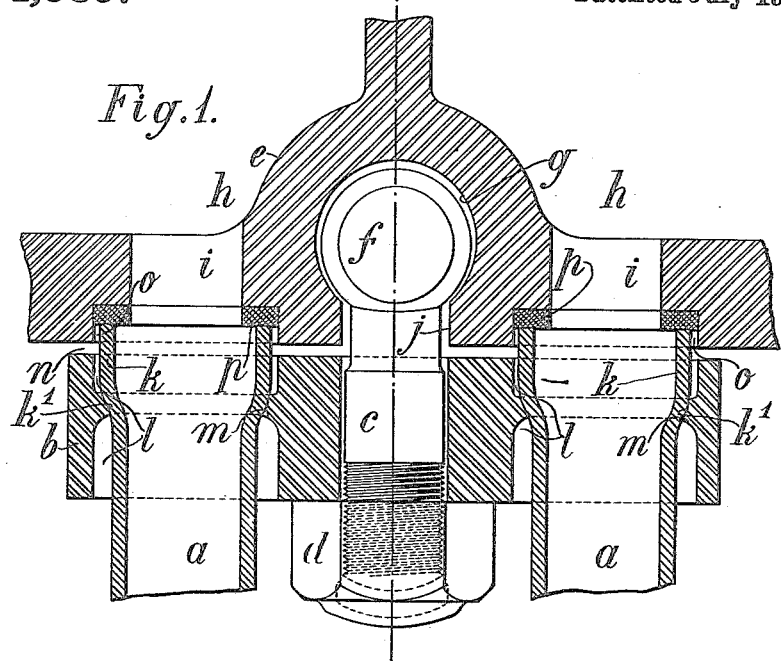
Figure 2:
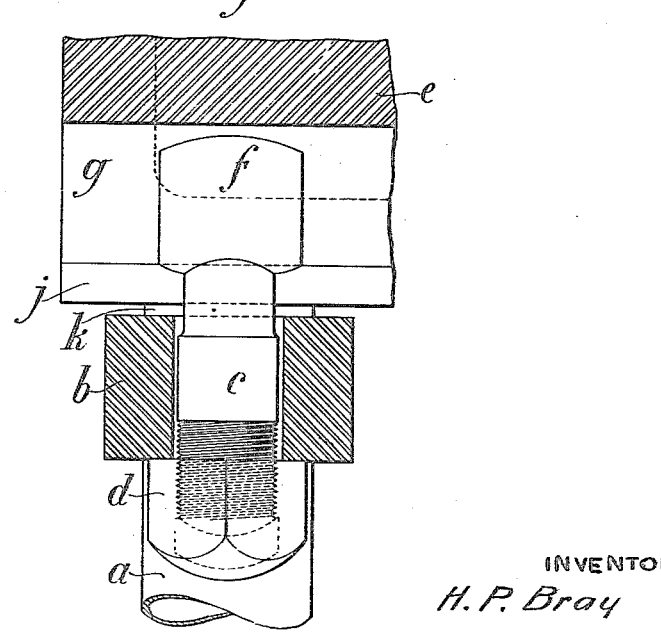

Figure 1 is a fragmentary sectional elevation, showing the invention carried out in connection with a steam superheater, and Fig. 2 is a fragmentary side elevation, partly in section, of the construction shown in Fig. 1.

In carrying out the invention, the ends of the tubes $a$, $a$ are connected to plates or flange blocks such as $b$ which are in turn detachably secured by means of screw-bolts $c$ and nuts $d$ to a steam header, chamber, collector or the like $e$. The heads $f$ of the bolts fit in slots $g$ arranged outside of the fluid spaces $h$ in the header, chamber, collector or the like and the ends of the tubes $a$ communicate with said spaces through apertures $i$. The wall of the header $e$ preferably has a bulge inwardly where the slot $g$ is provided.

The engagement of the bolts $c$—$f$ with the header, chamber, collector or the like $e$ is such that a slight rocking or universal movement of said bolts relatively to said header is provided for, and for this purpose the slot $g$ is cylindrical and the head $f$ of the bolt $c$ is of barrel shape, so that said head can swivel in all directions within said slot and allow the plate or flange block $b$ and the tubes $a$ to move relatively to the header $e$.

The shank of the bolt $c$ passes through a slot $j$ communicating with the slot $g$. During the manufacture of the parts a hole is simply drilled in the header or the like to form the slot $g$ and then the slot $j$ is formed in the header or the like by means of a slotting or shaping machine. These operations are much easier and cheaper than those necessary when forming dovetail slots in the header or the like in a manner which has heretofore been adopted.

Means are provided to allow for rocking or universal movement of the ends of the tubes within and relatively to the plate or flange block $b$ without said ends being displaced from said plate or block. For this purpose the tube ends are enlarged and formed with curved surfaces $k'$ by being expanded, as at $k$, and the perforations formed in the plate or block to receive the tube ends are enlarged as at $l$, to provide comparatively narrow seatings $m$ intermediate their ends for contact with the tube ends and to form clearances above and below said seatings. With this construction the tube ends can rock on the seatings $m$ and relatively to the plate or flange block and the header, chamber, collector or the like, and this in addition to the movement allowed for by the particular construction of the bolts $c$.

The extremities of the ends of the tubes bridge the gap $n$ formed between the plates or flange blocks $b$ and the header, chamber, collector or the like, and seat within recesses $o$ formed in the latter and against india rubber, asbestos, leather, copper, or other packing rings, or gasket washers $p$, thus providing perfectly fluid tight and flexible joints between the tubes and the header, chamber, collector or the like.

By loosening the nuts $d$ on the bolts $c$ sufficiently to free the ends of the tubes $a$ from the recesses $o$ the plates or flange blocks $b$ and the tubes can be bodily removed from the header or the like $e$, the bolts $c-f$ sliding along and out of the slots $g$ and $j$ in known manner. Reversely, when the parts are assembled and the nuts $d$ are screwed up tight the ends of the tubes are tightly pressed against the packing rings or washers $p$ to provide fluid-tight joints at these points. The universal movement of the tubes or the like relatively to the headers, chambers, collectors or the like adequately allows for unequal expansion and contraction of the various parts. Leakage of fluid between the ends of the tubes and the headers, chambers, collectors, or the like is positively prevented. The machining necessary when manufacturing the superheaters, boilers or the like is greatly simplified, thus economizing the cost of production of the same.

What I claim is:—

1. In combination, a block having a central passageway, a fluid container having a slot in the wall but out of communication with the fluid space, said slot being circular in cross section, a second slot extending longitudinally with the first slot and opening thereinto but having a width less than the diameter of the first slot, a plurality of apertures in the wall of the container, recesses countersunk in said apertures on the same side of the container as the second slot, a packing ring seated in each recess, tubes having expanded ends received within the recesses and abutted against said packing rings, said block having perforations for receiving said tube ends, and a bolt passed through the central passageway of the block with its head engaged in the first slot, said head being substantially barrel-shaped whereby the block may swing with a universal movement relative to the container, the bolt holding the block to the container and the tube ends spacing the inner face of the block from the outer side of the container, whereby the tubes can move relative to the container while the block can move relative to the container under the influences of expansion and contraction.

2. In combination, a block having a central passageway, a fluid container having a slot in the wall but out of communication with the fluid space, said slot being substantially circular in cross section, a second slot extending longitudinally with the first slot and opening thereinto but having a width less than the diameter of the first slot, a plurality of apertures in the wall of the container at each side of the slots, tubes having expanded ends received within the apertures, said block having perforations for receiving said tubes, a seat provided intermediate the ends of each perforation against which seat the rounded face of the expanded tube end may bear, said seat being circular and of less diameter than the perforation, and a bolt passed through the central passageway of the block with its head engaged in the first slot and its shank loosely fitting the second slot, said head being substantially barrel-shaped whereby the block may swing relative to the container about two axes at right angles to each other, the bolt holding the block to the container and the tube ends spacing the inner face of the block from the outer side of the container, so that the tubes can move relatively to both the block and container and independently of the block while the block can move relatively to the container independently of the tubes under the influences of expansion and contraction.

In testimony whereof I have hereunto signed my name.

HERBERT PAINE BRAY.